(12) United States Patent
Wadi et al.

(10) Patent No.: US 9,982,638 B2
(45) Date of Patent: May 29, 2018

(54) WATER/SNOW MANAGEMENT FOR AIR INTAKE SYSTEM TO ACTIVE GRILL SYSTEM INTERFACE

(71) Applicant: FORD GLOBAL TECHNOLOGIES, LLC, Dearborn, MI (US)

(72) Inventors: Samer Wadi, Windsor (CA); Andrew Szydlowski, Canton, MI (US); Davinder Basra, Windsor (CA); Tommy Tran, Ferndale, MI (US); Behtash Tavakoli, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 66 days.

(21) Appl. No.: 15/150,964

(22) Filed: May 10, 2016

(65) Prior Publication Data
US 2017/0328317 A1 Nov. 16, 2017

(51) Int. Cl.
*F02M 35/10* (2006.01)

(52) U.S. Cl.
CPC *F02M 35/10275* (2013.01); *F02M 35/10262* (2013.01)

(58) Field of Classification Search
CPC ...... B60K 13/02; B60K 11/08; F02M 35/161; F02M 35/10262; F02M 35/04; F02M 35/088
See application file for complete search history.

(56) References Cited

U.S. PATENT DOCUMENTS

| 4,420,057 | A | 12/1983 | Omote et al. | |
|---|---|---|---|---|
| 8,281,887 | B2* | 10/2012 | Khouw | B60K 13/02 180/68.3 |
| 8,439,143 | B2* | 5/2013 | Leanza | B60K 13/02 123/198 E |
| 8,474,558 | B2* | 7/2013 | Ohira | F02M 35/161 180/68.3 |
| 8,528,679 | B2 | 9/2013 | Stuckey | |
| 8,540,043 | B2* | 9/2013 | Mehlos | F02M 35/161 180/68.1 |
| 2005/0230162 | A1* | 10/2005 | Murayama | B60K 11/08 180/68.1 |
| 2010/0032220 | A1* | 2/2010 | Ohira | F02M 35/10013 180/68.3 |

(Continued)

FOREIGN PATENT DOCUMENTS

| DE | 102013006245 A1 | 10/2014 |
|---|---|---|
| JP | 2002211252 A | 7/2002 |

OTHER PUBLICATIONS

English Machine Translation of DE102013006245A1.
English Machine Translation of JP2002211252A.

*Primary Examiner* — Long T Tran
(74) *Attorney, Agent, or Firm* — Jason Rogers; King & Schickli PLLC

(57) ABSTRACT

An air intake assembly for a vehicle includes a vehicle-forward air intake inlet, an airflow diverter opening, and a moisture-diverting gutter surrounding a portion of the vehicle-forward air intake inlet. The moisture-diverting gutter may surround at least a top and opposed sides of the vehicle-forward air intake inlet. The assembly further includes an air intake inlet shield which may define a slope. The airflow diverter opening may be positioned below the vehicle-forward air intake inlet.

19 Claims, 4 Drawing Sheets

(56) References Cited

U.S. PATENT DOCUMENTS

2012/0111653 A1*  5/2012  Stuckey ................. B60K 11/08
                                                      180/68.3
2012/0298434 A1* 11/2012  Khouw ................. B60K 13/02
                                                      180/68.3
2017/0057337 A1*  3/2017  Kunimasa .............. B60K 11/04

* cited by examiner

WATER/SNOW MANAGEMENT FOR AIR INTAKE SYSTEM TO ACTIVE GRILL SYSTEM INTERFACE

TECHNICAL FIELD

This disclosure relates generally to airflow control for motor vehicles. In particular, the disclosure relates to a vehicle-forward air intake assembly for a vehicle which controls moisture ingestion during vehicle operation.

BACKGROUND

Air intakes are provided for vehicles to allow drawing in fresh air to the vehicle engine and engine bay. This allows provision of fresh air to the vehicle engine for cooling, bringing Rise Over Ambient (ROA) values down. Fresh air intake also allows more fuel to be burned without altering optimum fuel-to-air ratios, etc.

Conventionally, fresh air intakes are hidden within the vehicle engine bay and are not directly vehicle-forward facing. This is because moisture management in front air intake-equipped vehicles is more challenging. Front air intakes tend to draw in moisture in the form of water, rain, snow, slush, etc., degrading engine performance and drivability.

To solve this and other problems, the present disclosure relates to a vehicle-forward air intake assembly for a vehicle. Advantageously, the described assembly controls and reduces moisture (snow, ice, etc.) ingestion by the air intake during vehicle operation, improving vehicle driveability and engine performance.

SUMMARY

In accordance with the purposes and benefits described herein, in one aspect of the disclosure an air intake assembly for a vehicle is described, comprising a vehicle-forward air intake inlet, an airflow diverter opening, and a moisture-diverting gutter surrounding a portion of the vehicle-forward air intake inlet. The assembly further includes an air intake inlet shield. The airflow diverter opening may be positioned below the vehicle-forward air intake inlet.

In embodiments, the moisture-diverting gutter surrounds at least a top and opposed sides of the vehicle-forward air intake inlet. The air intake inlet shield may define a slope. In particular embodiments, the air intake inlet shield defines a slope of at least 0.11 (mm/mm) or 11%.

In embodiments, the vehicle-forward air intake inlet defines a width dimension of 84.53 mm and a height dimension of 33.53 mm. In embodiments, the airflow diverter opening is positioned 18.87 mm below the vehicle-forward air intake inlet. The moisture-diverting gutter may be a C-channel gutter, in embodiments defining a width dimension of 13.74 mm and a height dimension of 5.04 mm.

In the following description, there are shown and described embodiments of the disclosed vehicle-forward air intake assembly. As it should be realized, the devices and systems are capable of other, different embodiments and their several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vehicle-forward air intake assembly, and together with the description serve to explain certain principles thereof. In the drawings.

Reference will now be made in detail to embodiments of the disclosed vehicle-forward air intake assembly, examples of which are illustrated in the accompanying drawing figures.

DETAILED DESCRIPTION

Figure 1:
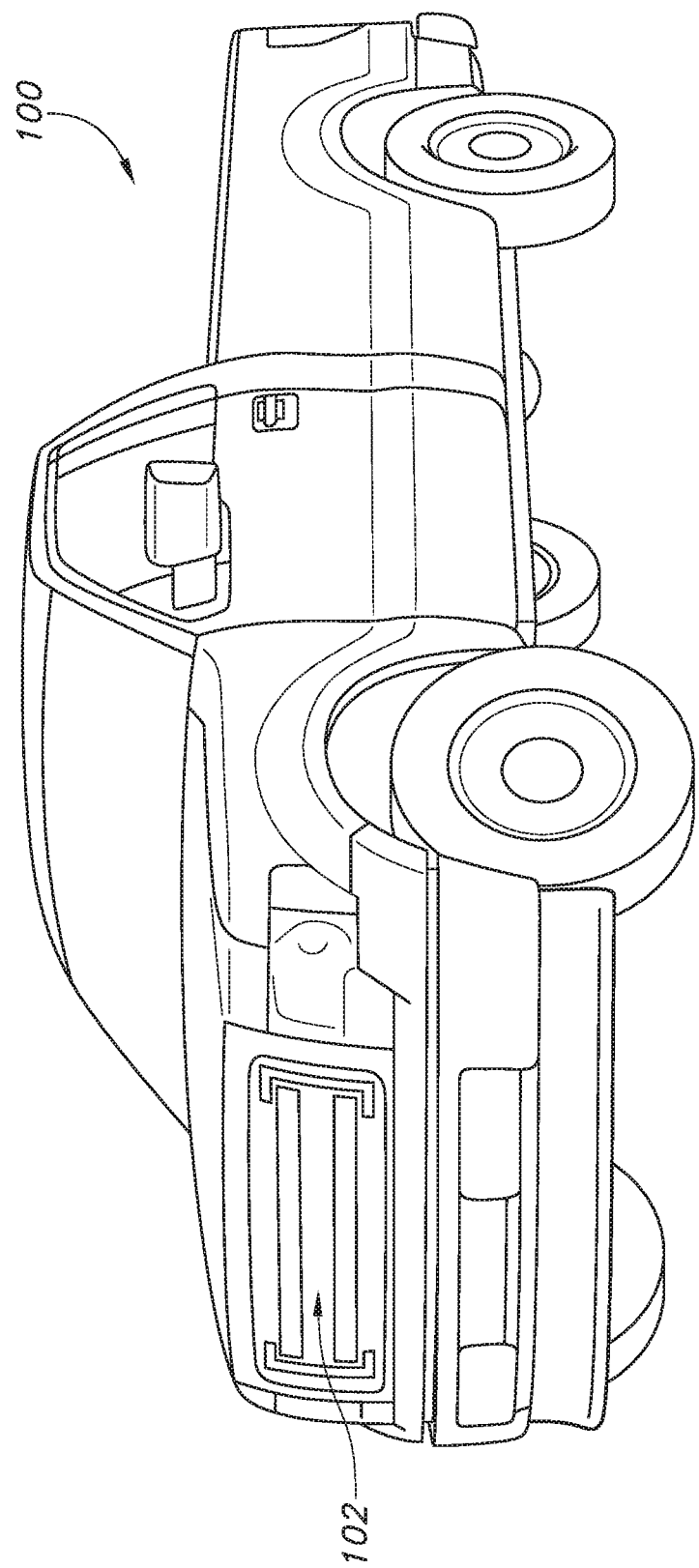
FIG. 1 shows a vehicle including a front-facing air intake system.

With reference to FIG. 1, as described above it is known to provide a motor vehicle 100 including an air intake assembly 102 (not visible in this view). This allows provision of fresh air to the vehicle engine (not shown) for cooling, providing air to the engine to allow more fuel to be burned without altering optimum fuel-to-air ratios, etc. However, conventional front air intake systems also allow intake of moisture from the environment, for example rain, snow, slush, etc.

Figure 2:
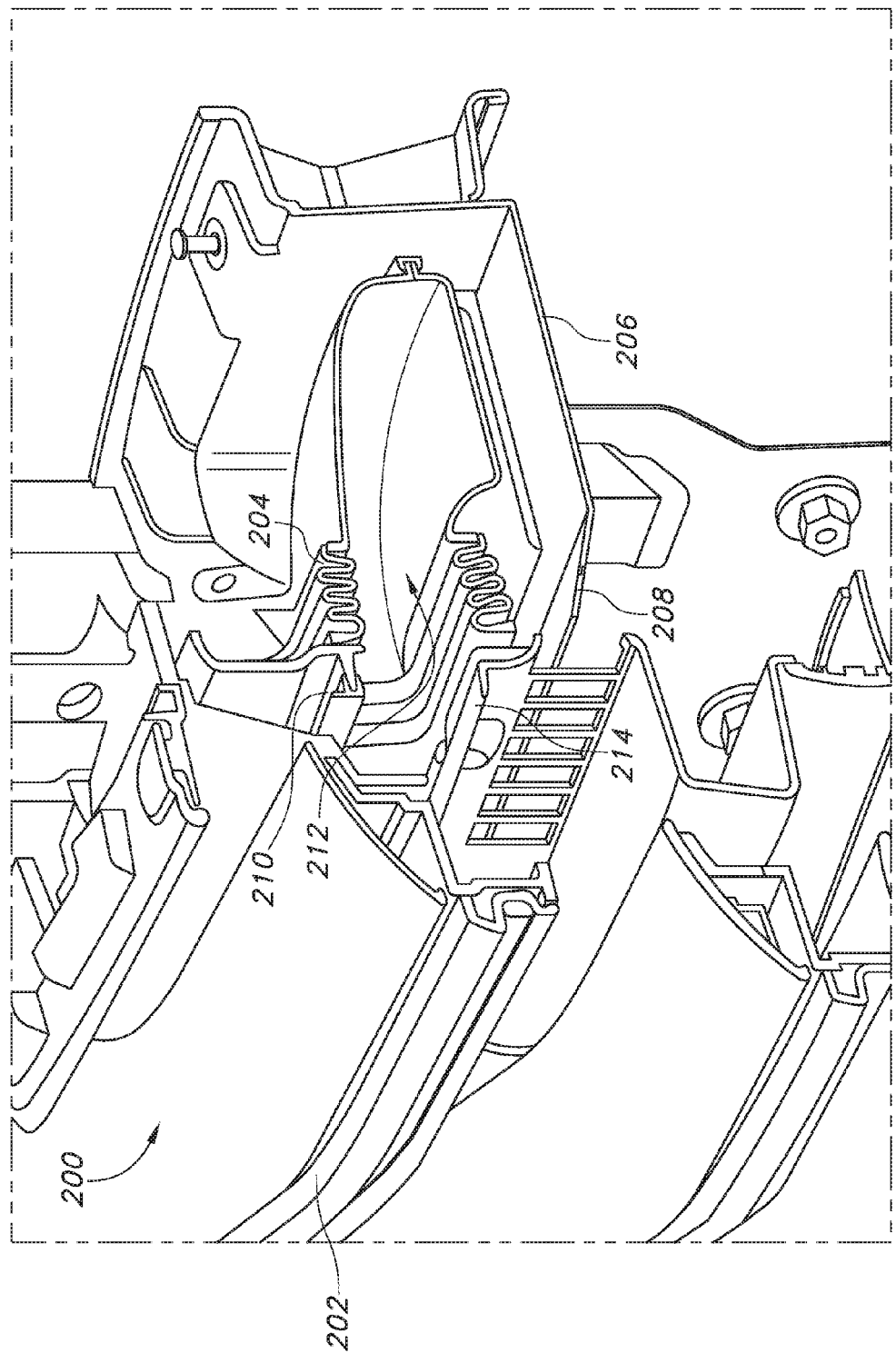
FIG. 2 shows a vehicle-forward air intake assembly according to the present disclosure.

To solve this and other problems, with reference to FIG. 2 there is shown a vehicle-forward air intake assembly 200 according to the present disclosure. The air intake assembly 200 is mounted rearward of a vehicle front fascia/upper grille assembly 202. A vehicle-forward-facing air intake duct 204 is provided, in the depicted embodiment being positioned substantially above a radiator upper seal 206. The vehicle-forward-facing air intake duct 204 in an embodiment defines an arcuate or L-shaped configuration, and may be housed within a sealed chamber (not shown). An airstream diverter opening 208 is disposed below the vehicle-forward-facing air intake duct 204. A moisture-diverting gutter 210 is disposed to surround a portion of the mouth 212 of the vehicle-forward facing air intake duct 204. An air inlet shield 214 is disposed below the mouth 212 of the vehicle-forward-facing air intake duct 204.

Figure 3:
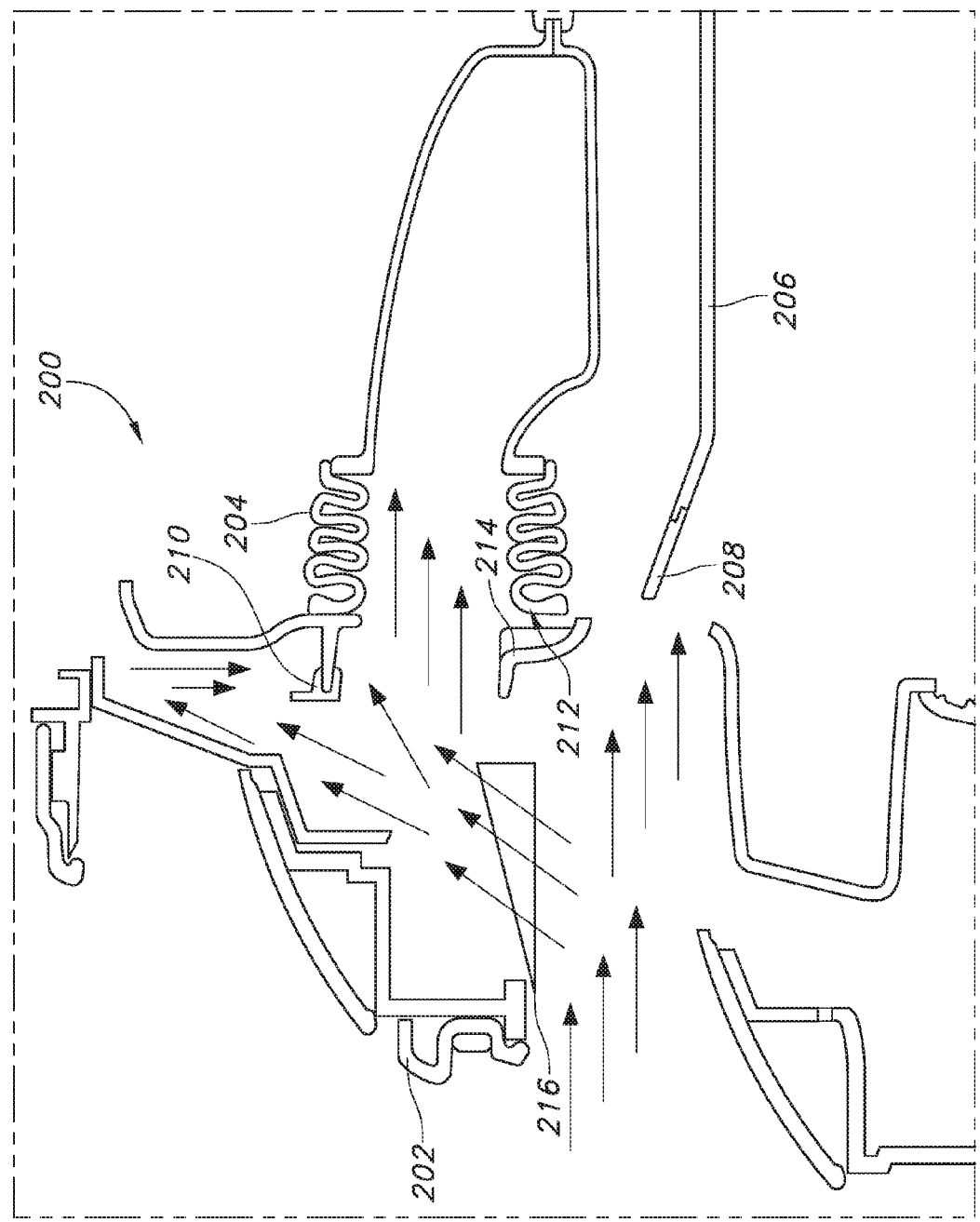
FIG. 3 shows an airflow pattern provided by the vehicle-forward air intake assembly of FIG. 2.

As shown in FIG. 3, during vehicle 100 operation, air flow (see arrows) is diverted into a tortuous path by the above-described structures. A portion of the airflow is diverted through the airstream diverter opening 208 by the air inlet shield 214. This reduces air pressure around the vehicle-forward-facing air intake duct 204. Another portion of the airflow is diverted upwardly, and a recirculation zone is created at top and behind the moisture-diverting gutter 210. By these split airflows, the vehicle-forward-facing air intake duct 204 is shielded from direct air flow. By the portions of the airflow diverted through the airflow diverter opening 208 and the portion of the airflow diverted upwardly, moisture (snow, slush, water droplets, etc.) are diverted from entering the mouth 212 of the vehicle-forward-facing air duct 204. A third, relatively moisture-free portion of the airflow passes through the mouth 212 of the vehicle-forward-facing air intake duct 204.

In embodiments, the vehicle-forward air intake inlet 204 defines a width dimension of 84.53 mm and a height dimension of 33.53 mm. The air inlet shield 214 in embodiments defines a slope 216 of at least 0.11 (mm/mm) or 11%, i.e. a minimum angle from shielding to inlet of 6.28 degrees. In embodiments, the airstream diverter opening 208 is positioned 18.87 mm below the vehicle-forward-facing air intake inlet 204 and defines an effective size of at least 127 mm width and 26 mm height to provide the desired reduction in air pressure around the air intake inlet mouth 212.

Figure 4:
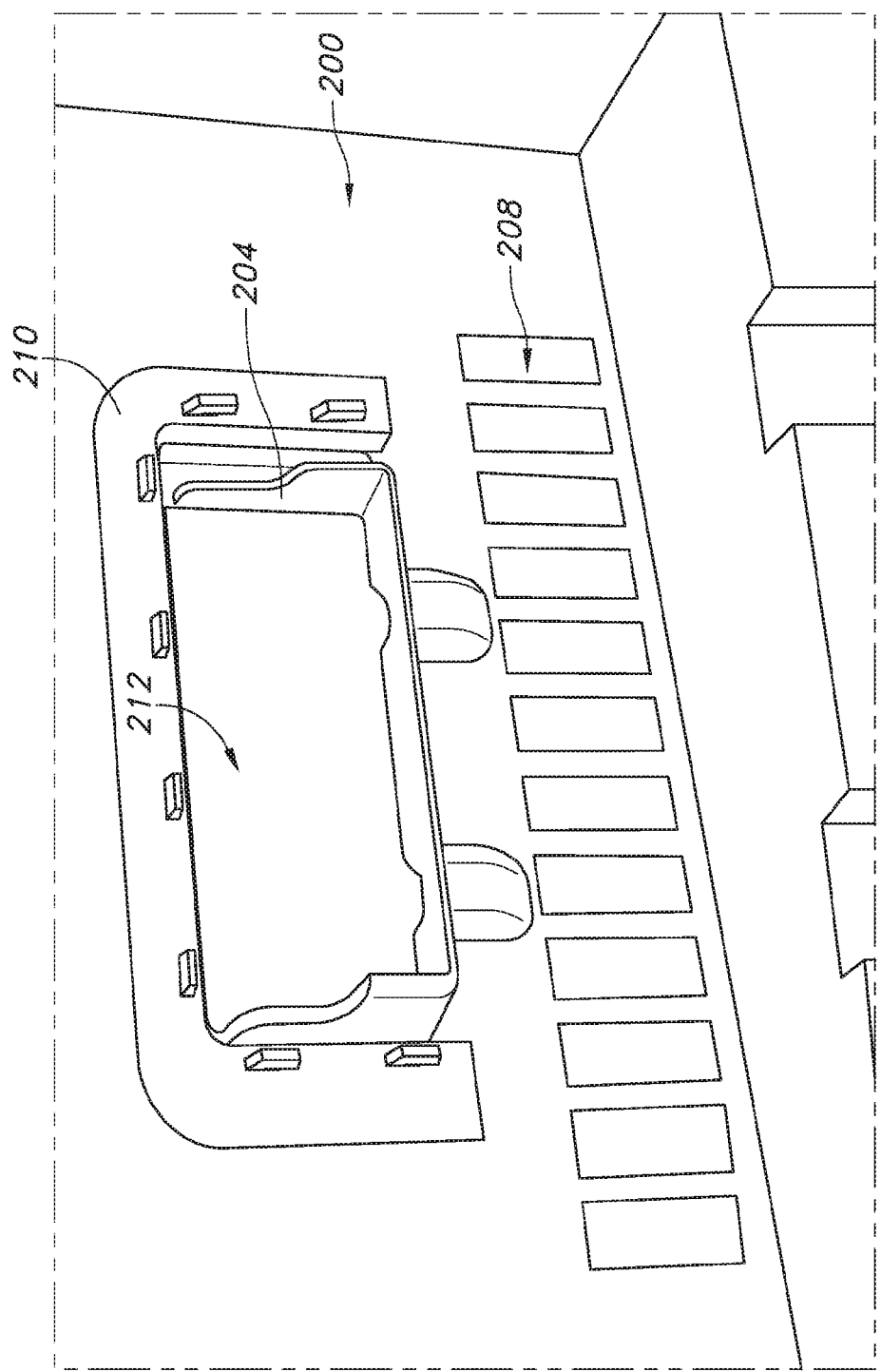
FIG. 4 shows a moisture-diverting gutter and airflow diverting aperture for the vehicle-forward air intake assembly of FIG. 2.

Because moisture in the upwardly diverted portion of the airflow falls out of the airstream and is attracted towards the vehicle-forward-facing air intake inlet 204 by vacuum and gravity, the moisture-diverting gutter 210 is positioned to trap this moisture and divert it from the vehicle-forward-facing air intake duct 204. In an embodiment, the moisture-diverting gutter 210 is disposed substantially along a top and opposed side edges of the mouth 212 of the vehicle-forward-facing air intake duct 204 (see FIG. 4). In embodiments, the moisture-diverting gutter 210 is a C-channel gutter having a width dimension of 13.74 mm and a height dimension of 5.04 mm.

Thus, by the above-described structures and mechanisms, a forward-facing air intake for a vehicle is provided which minimizes moisture intake during vehicle operation. By the described assembly, particularly for engines such as high performance or diesel engines having increased suction power, by reducing moisture intake degradation of vehicle drivability is decreased. By the forward positioning of the air intake inlet 204, fresh air is drawn into the engine to reduce heat, bringing Rise Over Ambient (ROA) values down. In turn, increased air intake is possible compared to conventional air intakes hidden within the vehicle engine bay.

Obvious modifications and variations are possible in light of the above teachings. All such modifications and variations are within the scope of the appended claims when interpreted in accordance with the breadth to which they are fairly, legally and equitably entitled.

What is claimed:

1. An air intake assembly for a vehicle, comprising:
   a vehicle-forward air intake inlet;
   an airflow diverter opening;
   a moisture-diverting gutter surrounding a portion of the vehicle-forward air intake inlet; and
   an air intake inlet shield positioned to divide an airflow into a first portion passing through the airflow diverter opening, a second portion passing upwardly towards the moisture diverting gutter, and a third portion entering the air intake inlet.

2. The assembly of claim 1, wherein the moisture-diverting gutter surrounds at least a top and opposed sides of the vehicle-forward air intake inlet.

3. The assembly of claim 2, wherein the air intake inlet shield defines a slope.

4. The assembly of claim 2, wherein the air intake inlet shield defines a slope of at least 0.11 (mm/mm) or 11%.

5. The assembly of claim 4, wherein the airflow diverter opening is positioned 18.87 mm below the vehicle-forward air intake inlet.

6. The assembly of claim 1, wherein the vehicle-forward air intake inlet defines a width dimension of 84.53 mm and a height dimension of 33.53 mm.

7. The assembly of claim 1, wherein the airflow diverter opening is positioned below the vehicle-forward air intake inlet.

8. The assembly of claim 7, wherein the C-channel gutter defines a width dimension of 13.74 mm and a height dimension of 5.04 mm.

9. The assembly of claim 1, wherein the moisture-diverting gutter is a C-channel gutter.

10. A vehicle including the assembly of claim 1.

11. An air intake assembly for a vehicle, comprising:
    a vehicle-forward air intake inlet;
    an airflow diverter opening;
    a moisture-diverting gutter surrounding a portion of the vehicle-forward air intake inlet; and
    a sloped air intake inlet shield which divides an airflow entering the assembly into a first portion passing through the airflow diverter opening, a second portion passing upwardly towards the moisture diverting gutter, and a third portion entering the air intake inlet.

12. The assembly of claim 11, wherein the moisture-diverting gutter surrounds at least a top and opposed sides of the vehicle-forward air intake inlet.

13. The assembly of claim 11, wherein the air intake inlet shield defines a slope of at least 0.11 (mm/mm) or 11%.

14. The assembly of claim 11, wherein the vehicle-forward air intake inlet defines a width dimension of 84.53 mm and a height dimension of 33.53 mm.

15. The assembly of claim 11, wherein the airflow diverter opening is positioned below the vehicle-forward air intake inlet.

16. The assembly of claim 15, wherein the airflow diverter opening is positioned 18.87 mm below the vehicle-forward air intake inlet.

17. The assembly of claim 11, wherein the moisture-diverting gutter is a C-channel gutter.

18. The assembly of claim 17, wherein the C-channel gutter defines a width dimension of 13.74 mm and a height dimension of 5.04 mm.

19. A vehicle including the assembly of claim 11.

* * * * *